(12) United States Patent
Li et al.

(10) Patent No.: US 8,036,235 B2
(45) Date of Patent: Oct. 11, 2011

(54) HOME GATEWAY DEVICE

(75) Inventors: Han Li, Beijing (CN); Yan Zhang, Beijing (CN); Jinglei Liu, Beijing (CN); Congxing Ouyang, Beijing (CN); Bing Wei, Beijing (CN); Yuhong Huang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 272 days.

(21) Appl. No.: 12/299,005

(22) PCT Filed: Apr. 29, 2007

(86) PCT No.: PCT/CN2007/001468
§ 371 (c)(1),
(2), (4) Date: Oct. 29, 2008

(87) PCT Pub. No.: WO2007/128237
PCT Pub. Date: Nov. 15, 2007

(65) Prior Publication Data
US 2010/0008370 A1  Jan. 14, 2010

(30) Foreign Application Priority Data

Apr. 30, 2006  (CN) .......................... 2006 1 0079599

(51) Int. Cl.
*H04L 12/28* (2006.01)
*H04L 12/56* (2006.01)
(52) U.S. Cl. .................. 370/401; 370/392; 370/419
(58) Field of Classification Search .................. 370/389, 370/392, 401, 419
See application file for complete search history.

(56) References Cited

U.S. PATENT DOCUMENTS

| | | | |
|---|---|---|---|
| 6,434,627 B1 | 8/2002 | Millet et al. | 709/245 |
| 7,184,427 B1* | 2/2007 | Carew et al. | 370/352 |
| 7,509,487 B2* | 3/2009 | Lu et al. | 713/151 |
| 2003/0177500 A1* | 9/2003 | Nakamura et al. | 725/105 |
| 2003/0217110 A1* | 11/2003 | Weiss | 709/207 |
| 2004/0100978 A1* | 5/2004 | Saito et al. | 370/401 |

FOREIGN PATENT DOCUMENTS

| | | |
|---|---|---|
| CN | 1459957 A | 12/2003 |
| CN | 1481128 A | 3/2004 |
| EP | 1441483 | 7/2004 |
| KR | 20050019647 A | 3/2005 |
| TW | 250747 B | 3/2006 |
| WO | 2006/074338 | 7/2006 |
| WO | 2006/108113 | 10/2006 |

* cited by examiner

*Primary Examiner* — Ronald Abelson
(74) *Attorney, Agent, or Firm* — Fay Kaplun & Marcin, LLP

(57) ABSTRACT

The present invention relates to a home gateway device. The home gateway device comprises a main processor generate information process signals and control signals, a computer bus signal Ethernet adapter unit connected to the main processor to translate the signals between computer bus signals and Ethernet signals, an Ethernet frame process unit connected to the computer bus signal Ethernet adapter unit to forward the received Ethernet frame based on a prearranged policy, an inner interface unit connected to the Ethernet frame process unit to connect interior networking devices, and an outer communication module connected to the main processor and the Ethernet frame process unit. The centralized control of the home gateway device of the present invention can decrease the requirement that the household appliances should be intellectualized, thereby achieving more flexible control and reducing the cost. The uplink and downlink Ethernet signals are controlled by using the prearranged policy to separate the Ethernet signals for Internet access from the Ethernet signals of the household information appliances, and avoid the threat due to the unsafe factors.

16 Claims, 4 Drawing Sheets

HOME GATEWAY DEVICE

FIELD OF THE INVENTION

The present invention relates to a home gateway device. In particular, the present invention relates to a home gateway device which separates the Internet channel from the household information appliances control channel by distinguishing external signals from internal access signals.

BACKGROUND OF THE INVENTION

With the arrival of the "information age" and the popularization of computer networks, intellectualizing and networking inside households are gradually becoming realities. Presently there are various researches on the subject of an intelligent household network. Most of these researches are based on existing computer network technologies, where different household appliances and devices are connected into a network to provide a diversity of services that are convenient, comfortable, safe and efficient to use through the network. An important subject of these researches is how to implement information exchange between the exterior and interior of a household, namely how to enable a user to manage and control interior devices of a household by using exterior devices and a highly developed network. An optimal home gateway is necessary for carrying out such management and control operations.

A home gateway is a physical interface that connects interior network of a household to exterior networks, while at the same time it is also a platform that enables a household user to receive various household services (including existing services and services that may appear in the future). A home gateway can receive communication signals from exterior networks, and pass these signals to some consumer appliances through a household network. The application of a home gateway is not limited to high-speed Internet access. In the future when broadband becomes a standard for most households, more services and contents will be made available, for example, video phones that mix video and audio information streams, interactive entertainment services such as network gaming, etc. A home gateway can execute intelligent routing algorithms, so as to distribute information streams (data) to different devices such as telephones, intelligent electrical appliances, digital TVs and audios, etc. For example, an advanced home gateway can send a phone call to one particular phone in a household based on the caller's ID, so that a phone call for the children will be sent to their room, or phone calls (besides urgent calls) can only be sent to places that are far away from the bed room after 10 PM in the night.

Existing home gateways generally support Internet access as well as intelligent household appliances control, but still have the following shortcomings: Firstly, when a user is controlling an intelligent household appliance through an exterior communication network, the control scheme utilized is to directly control the specific household device. If there are a relatively greater number of devices in the household, this control scheme will increase the operational complexity and manufacturing cost of the home gateway. Secondly, it is hard to effectively isolate information when Internet access signals of a computer and control signals of intelligent household appliances are both entering a home gateway, hence creating security risks such as illegal users outside a house using the Internet to control intelligent household appliances inside the house or to conduct destructive operations, thus causing property loss and psychological harm to the user. Finally, when control signals of an interior intelligent appliance are entering a home gateway, the home gateway may not be able to effectively distinguish between Internet access signals and household appliance control signals, thus causing Internet access interruption or errors in control information.

SUMMARY

In view of the many disadvantages of current home gateways, the aim of the present invention is to provide a home gateway device, in order to reduce the complexity of controlling interior networking devices, ensure the safety of a household interior network, prevent access and control from external illegal users, and differentiate between Internet signals and household appliance control signals, so as to avoid the probabilities of networking interruptions and control information errors.

In order to achieve the above aims, the present invention provides a home gateway device, comprising:

a main processor, for generating information process signals and control signals;

a computer bus signal Ethernet adapter unit, connected to the main processor, for translating the signals between computer bus signals and Ethernet signals;

an Ethernet frame process unit, connected to the computer bus signal Ethernet adapter unit, for forwarding the received Ethernet frame based on a prearranged frame processing policy;

an inner interface unit, connected to the Ethernet frame process unit, for connecting interior networking devices; and an outer communication module, connected to the main processor and the Ethernet frame process unit, for address translation and data transfer between an interior network and an exterior communication network.

In one embodiment of the present invention, the inner interface unit is any one of the following: a power line communication modulation and demodulation unit, an Ethernet interface unit, a wireless local area network access point, or any combination of the above; the power line communication modulation and demodulation unit is used for performing modulation and demodulation operations between power line carrier signals and data signals; the Ethernet interface unit is used for connecting interior networking devices through Ethernet connection; the wireless local area network access point is used for connecting interior networking devices through wireless connection.

In another embodiment of the present invention, the computer bus signal Ethernet adapter unit is a USB signal Ethernet adapter unit or a PCI bus Ethernet adapter unit; the USB signal Ethernet adapter unit is used for performing signal transformation between USB signals and Ethernet signals; the PCI bus Ethernet adapter unit is used for performing signal transformation between PCI signals and Ethernet signals.

In another embodiment of the present invention, the home gateway device further comprises a USB signal logic signal adapter unit, connected to the power line communication modulation and demodulation unit and the main processor, for performing transformation between USB signals and serial logic signals.

In another embodiment of the present invention, the Ethernet frame process unit comprises:

a first port connected to the outer communication module, for transferring Ethernet signals through the outer communication module;

a second port connected to the USB signal Ethernet adapter unit, for transferring USB format encapsulated Ethernet signals; and a third port connected to the power line communication modulation and demodulation unit, for transferring Ethernet signals between interior networking devices and the main processor.

In another embodiment of the present invention, the Ethernet frame process unit forwards the received Ethernet frame based on a prearranged frame processing policy. The processing policy is as follows:

1) Ethernet frames received from the first port are only to be forwarded to the third port. These Ethernet frames are not to be forwarded to the second port.

2) Ethernet frames received from the second port are only to be forwarded to the third port. These Ethernet frames are not to be forwarded to the first port.

3) For Ethernet frames received from the third port, the Ethernet frame process unit is to read the data format (i.e., encapsulation format) of the data content encapsulated in these Ethernet frames. If the encapsulation format of an Ethernet frame is USB frame, then this Ethernet frame is only to be forwarded to the second port. If the encapsulation format of an Ethernet frame is IP grouping, then this Ethernet frame is only to be forwarded to the first port.

In another embodiment of the present invention, the outer communication module comprises:

a PCI bus Ethernet adapter unit, connected to the main processor through a PCI bus, for signal transformation between PCI signals and Ethernet signals;

an exterior communication Ethernet frame processing unit, connected to the PCI bus Ethernet adapter unit, for forwarding received Ethernet frames according to a prearranged port control forwarding policy; and an exterior communication adapter unit, connected to the exterior communication Ethernet frame processing unit, for communicating with an exterior communication network.

In another embodiment of the present invention, the exterior communication Ethernet frame processing unit includes:

a fourth port connected to the exterior communication adapter unit, for transferring Ethernet signals through the exterior communication adapter unit;

a fifth port connected to the PCI bus Ethernet adapter unit, for transferring PCI encapsulated Ethernet signals; and a sixth port connected to the Ethernet frame process unit, for transferring Ethernet signals between an exterior communication network and a personal computer.

Before an exterior communication network communicates with an interior network of a household, it is necessary to perform network address translation (NAT). The exterior communication adapter unit configures the address translation, where a relation table of corresponding relations between public IP addresses/exterior network ports and specific IP addresses/interior network ports is generated. Hence a unique device in an interior network may be identified through an exterior network port, accomplishing the translation between a unique IP address in a public network and a specific IP address in an interior network.

When a packet of an exterior communication network passes through an exterior communication adapter unit, the unit analyzes the port information of the transport layer of the packet, then by checking the relation table of corresponding relations, translates the destination IP address to the IP address of an interior network device or a networking computer. The exterior network port may also be transformed to an interior network port at the same time.

When a packet of an interior network passes through an exterior communication adapter unit, the unit also translates specific IP addresses and specific ports of an interior network to public IP addresses and exterior network ports, by checking the relation table of corresponding relations.

In addition to NAT address translation, it is also necessary to perform media access control (MAC) address translation:

By analyzing packet information of a packet entering from the fourth port, the exterior communication adapter unit learns the source MAC address and source IP address of the packet, then store the corresponding relations of these addresses into an IP/MAC relation table.

When a packet of the exterior communication network passes through the exterior communication adapter unit, the unit firstly gets a specific IP address in the interior network through above mentioned NAT translation, then by looking up in the IP/MAC relation table, translates the destination MAC address of the packet into a device MAC address corresponding to the IP address in the interior network. On the other hand, when a packet of the interior network passes through the exterior communication adapter unit, the unit translates the source MAC address of the packet into the MAC address of the exterior communication adapter unit.

Through the above mentioned NAT address translation and MAC address translation, an exterior communication adapter unit achieves correct forwarding of interior network packets and exterior network packets.

For the exterior communication Ethernet frame processing unit, its frame processing policy is as follows:

For a frame entering the exterior communication Ethernet frame processing unit by the sixth port, the exterior communication Ethernet frame processing unit is to directly forward the frame through the fourth port without making any change to the frame.

For a frame entering the exterior communication Ethernet frame processing unit by the fifth port, the exterior communication Ethernet frame processing unit is to directly forward the frame through the fourth port without making any change to the frame.

For a frame entering the exterior communication Ethernet frame processing unit by the fourth port, the exterior communication Ethernet frame processing unit is to decide: 1. if the destination address of the frame is the MAC address of a computer, the frame is to be forwarded directly through the sixth port; 2. if the destination address of the frame is the MAC address of a main processor, the frame is to be forwarded directly through the fifth port.

In the situation where there are several networking computers connected to a home gateway device, the frame processing policy of an exterior communication Ethernet frame processing unit includes:

For frames entering the exterior communication Ethernet frame processing unit by the fourth port, as long as the destination address is the MAC address of a computer, these frames are to be forwarded through the sixth port and enter a communication connection configuration selection unit.

Based on the above technical scheme, the present invention has the following advantages:

1. The centralized control of the home gateway device of the present invention is able to reduce the requirements for the intellectualization of household information appliances, thus achieving easier control and lower configuration cost of intellectualized household appliances.

2. The home gateway device of the present invention utilizes prearranged frame processing policy and port control forwarding policy to control uplink and downlink Ethernet signals, achieving the isolation between the Ethernet signals for computer networking and Ethernet signals for household information appliances, thus avoiding the threats due to unsafe exterior factors.

The technical scheme of the present invention will be further illustrated in detail through the following drawings and embodiments.

DETAILED DESCRIPTION OF THE EMBODIMENTS

According to the present invention, a home gateway device utilizes a prearranged frame processing policy and a prearranged port control forwarding policy to control uplink and downlink Ethernet signals, thus separating Ethernet signals used for networking from Ethernet signals used by household information appliances. The separation of signals allows an operational signal used by household information appliances of an interior network to enter a main processor easily, and Internet signals to enter an exterior communication network directly, so that these two types of signals do not interference with each other.

A home gateway device mainly comprises: a main processor for generating information process signals and control signals; a computer bus signal Ethernet adapter unit connected with the main processor, for translating the signals between computer bus signals and Ethernet signals; an Ethernet frame process unit connected with the computer bus signal Ethernet adapter unit, for forwarding the received Ethernet frame based on a prearranged frame processing policy; an inner interface unit connected with the Ethernet frame process unit, for connecting household appliances in an interior network; and an outer communication module connected to the main processor and the Ethernet frame process unit, for address translation and data transfer between an interior network and an exterior communication network.

In a computer bus signal Ethernet adapter unit of a home gateway device, a variety of computer buses may be used to connect to an Ethernet, such as a Peripheral Component Interface (PCI) bus, an Integrated Drive Electronics (IDE) bus, a Universal Serial Bus (USB), etc. Since USB has many advantages, including but not limited to: plug-and-play, high transfer rate, low resource usage, support of more than one hundred ports, etc, USB has become a universal computer bus. The following embodiments of the present invention thus use USB as an example to illustrate the computer bus. The following embodiments of the present invention give detailed description of the home gateway device.

Embodiment 1

Figure 1:
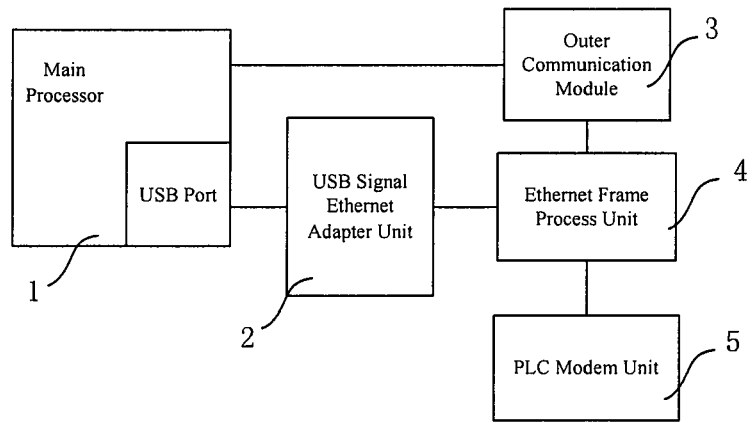
FIG. 1 is a schematic illustration showing the structure of a home gateway device provided by Embodiment 1 of the present invention.

As shown in FIG. 1, a schematic illustration showing the structure of a home gateway device provided by Embodiment 1 of the present invention, the home gateway device comprises: a main processor 1, a USB signal Ethernet adapter unit 2, an outer communication module 3, an Ethernet frame process unit 4, and a power line communication (PLC) modulation and demodulation (modem) unit 5. The main processor 1 is used for generating information process signals and control signals; the main processor 1 has USB ports and is connected to other modules of the home gateway device by a USB bus. The USB signal Ethernet adapter unit 2 is connected to a USB port of the main processor 1, and is used for signal translation between USB signals and Ethernet signals. For household information appliances inside a house, a main control computer is a host device, while the household information appliances inside the house are USB based exterior computer devices of the host device. The above host device and the host device mentioned in the following embodiments of the present invention both refer to the home gateway device described in the embodiments of the present invention. Hence, communication between a device inside a house and a main processor is ultimately transformed to USB-based communication, thus centralized communication and management for interior networking devices may be conveniently implemented. The isolation between a household interior network and an exterior network may also be achieved.

An outer communication module 3 is connected to an Ethernet frame process unit 4 and a main processor 1, and is used for address translation and data transfer between an interior network and an exterior communication network. The outer communication module 3 may utilize an integrated circuit board (ICB) design, and may be connected to the main processor through a computer bus (PCI, PCI-E or USB). The communication between the host device and the exterior communication network is based on the Internet Protocol (IP). The physical layer connection may be implemented using several different methods, including: the wireless method (such as High Speed Downlink Packet Access (HS-DPA), Worldwide Interoperability for Microwave Access (WiMax), etc), the Category 5 cable method, the optical fiber method, the cable TV coaxial cable method, the Digital Subscriber Line (DSL) method, and the power line based Power Line Communication (PLC) method, etc. The outer communication module utilizes the ICB design in order to improve the modularity of the home gateway, to enhance the maintainability of the system, and to make upgrades/modifications more convenient. When a household network is establishing or changing the implementation method of the physical layer connection that connects to the exterior communication network, the hardware configuration requirements may be satisfied by plugging/drawing corresponding communication ICB boards into/from the host device. In Embodiment 1, an inner interface unit only comprises a PLC modem unit 5 which is connected to the Ethernet frame process unit 4. The PLC modem unit 5 is used for demodulating a power line carrier signal transferred by a power line into an Ethernet signal, and sending the Ethernet signal to the Ethernet frame process unit 4. The PLC modem unit 5 is also used for modulating an Ethernet signal sent by the Ethernet frame process unit 4 and transferring the modulated signal on the power line. Since households usually have power lines that cover the entire house, in practice it is very convenient to use power lines for data transfer, as long as the room has a power socket. The PLC modem unit 5 is able to demodulate a power line carrier signal into an Ethernet signal, as well as modulate an Ethernet signal into a power line carrier signal; hence the PLC modem unit 5 implements the modulation and demodulation operations between power line carrier signals and Ethernet signals.

Figure 2:
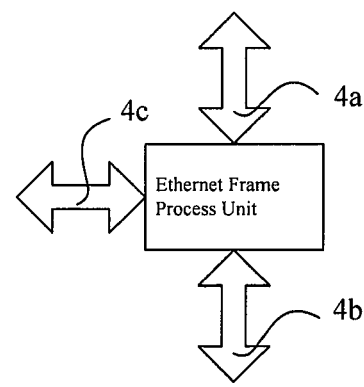
FIG. 2 is a schematic illustration showing the ports of an Ethernet frame process unit of a home gateway device as described in the present invention.

An Ethernet frame process unit 4 is connected to a USB signal Ethernet adapter unit 2, an outer communication module 3 and a PLC modem unit 5, respectively. The Ethernet frame process unit 4 forwards received Ethernet frames according to a prearranged policy. In accordance with the three connection methods described above, FIG. 2 is a schematic illustration showing the ports of an Ethernet frame process unit of a home gateway device as described in the present invention. The Ethernet frame process unit 4 is configured to have three ports, including: a first port 4a connected to the outer communication module 3, for transferring Ethernet signals to an exterior communication network through the outer communication module 3; a second port 4b connected to the USB signal Ethernet adapter unit 2, for transferring USB-encapsulated Ethernet signals; a third port 4c connected to the PLC modem unit 5, for transferring Ethernet signals between interior networking devices and the main processor.

In Embodiment 1, all household information appliances that need to communicate with a host device only encapsulate USB frames into their Ethernet frames. The Ethernet frames sent by all of these household information appliances are only sent to the main processor of the host device. All of these household information appliances do not support the IP protocol, the Ethernet frames sent by these household information appliances can not be transferred to any exterior communication networks.

All computers (including PC and handheld computers) that need to communicate with an exterior communication network only encapsulate IP group into their Ethernet frames. The Ethernet frames sent by all of the networking computers can not be sent to the main processor of the host device, but can only be sent to the outer communication module.

In order to improve the safety of an interior network of a household, an Ethernet frame processing policy is as follows:

1) There is only one destination address for Ethernet frames sent by household information appliances, that one destination address is the Media Access Control (MAC) address of the USB signal Ethernet adapter unit 2 connected to the Ethernet frame process unit 4 through the second port 4b. USB signal Ethernet adapter unit 2 is connected to the main processor 1 through a USB.

2) There is only one source address for Ethernet frames received by household information appliances, that one source address is the MAC address of the USB signal Ethernet adapter unit 2 connected to the Ethernet frame process unit 4 through the second port 4b. If the monitored MAC source address of an Ethernet frame is not the MAC address of the USB signal Ethernet adapter unit, then this Ethernet frame should be discarded by an information household appliance, even if the destination address is the address of the information household appliance.

In detail, for an Ethernet frame process unit, its frame processing policy is as follows:

1) Ethernet frames received from the first port 4a are only to be forwarded to the third port 4c. These Ethernet frames are not to be forwarded to the second port 4b.

2) Ethernet frames received from the second port 4b are only to be forwarded to the third port 4c. These Ethernet frames are not to be forwarded to the first port 4a.

3) For Ethernet frames received from the third port 4c, an Ethernet frame process unit is to read the data format (i.e. encapsulation format) of the data content encapsulated in these Ethernet frames. If the encapsulation format of an Ethernet frame is USB frame, then this Ethernet frame is only to be forwarded to the second port 4b. If the encapsulation format of an Ethernet frame is IP grouping, then this Ethernet frame is only to be forwarded to the first port 4a.

In this way, through the frame processing policy of an Ethernet frame process unit, the isolation of information is implemented between an interior network of a household and an exterior network.

Figure 3:
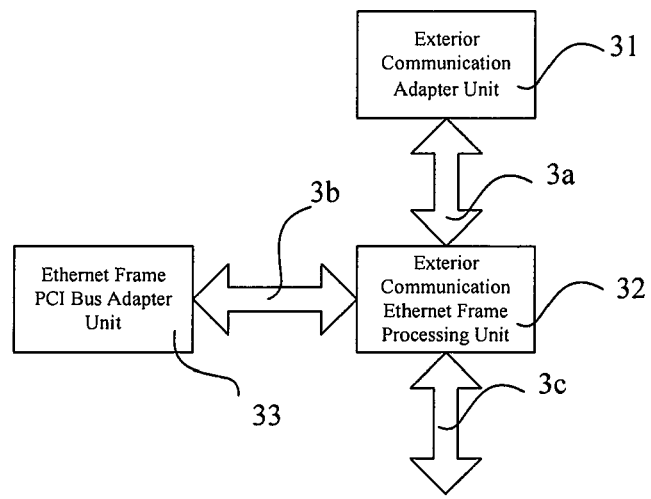
FIG. 3 is a schematic illustration showing the structure of an outer communication module of a home gateway device as described in the present invention.

An outer communication module 3 is connected to the main processor through a computer bus, as shown in FIG. 3. FIG. 3 is a schematic illustration showing the structure of an outer communication module of a home gateway device of the present invention. The outer communication module 3 comprising: PCI bus Ethernet adapter unit 33, which is connected to the main processor through a PCI bus, for signal transformation between PCI signals and Ethernet signals; exterior communication Ethernet frame processing unit 32, which is connected to the PCI bus Ethernet adapter unit, for forwarding received Ethernet frames according to a prearranged port control forwarding policy; exterior communication adapter unit 31, which is connected to the exterior communication Ethernet frame processing unit, for communicating with an exterior communication network.

The exterior communication Ethernet frame processing unit 32 has three ports: a fourth port 3a, a fifth port 3b, and a sixth port 3c. The fourth port 3a is connected to the exterior communication adapter unit 31, for transferring Ethernet signals through the exterior communication adapter unit; the fifth port 3b is connected to the PCI bus Ethernet adapter unit, for transferring PCI encapsulated Ethernet signals; the sixth port 3c is connected to the Ethernet frame process unit, for transferring Ethernet signals between an exterior communication network and a personal computer.

Before an exterior communication network communicates with an interior network of a household, it is necessary to perform network address translation (NAT). The exterior communication adapter unit configures the address translation, where a relation table of corresponding relations between public IP addresses/exterior network ports and specific IP addresses/interior network ports is generated. This relation table of corresponding relations may be configured in the exterior communication adapter unit, or configured in an independent module. Hence a unique device in an interior network may be identified through an exterior network port, accomplishing the translation between a unique IP address in a public network and a specific IP address in an interior network.

When a packet of an exterior communication network passes through an exterior communication adapter unit, the unit analyzes the port information of the transport layer of the packet, then by checking the relation table of corresponding relations, translates the destination IP address to the IP address of an interior network device or a networking computer. The exterior network port may also be transformed to an interior network port at the same time.

When a packet of an interior network passes through an exterior communication adapter unit, the unit also translates specific IP addresses and specific ports of an interior network to public IP addresses and exterior network ports, by checking the relation table of corresponding relations.

In addition to NAT address translation, it is also necessary to perform MAC address translation:

By analyzing packet information of a packet entering from the fourth port 3a, the exterior communication adapter unit learns the source MAC address and source IP address of the packet, then store the corresponding relations of these addresses into an IP/MAC relation table.

When a packet of the exterior communication network passes through the exterior communication adapter unit, the unit firstly gets a specific IP address in the interior network through above mentioned NAT translation, then by looking up in the IP/MAC relation table, translates the destination MAC address of the packet into a device MAC address corresponding to the IP address in the interior network. On the other hand, when a packet of the interior network passes through the exterior communication adapter unit, the unit translates the source MAC address of the packet into the MAC address of the exterior communication adapter unit.

Through the above mentioned NAT address translation and MAC address translation, an exterior communication adapter unit achieves correct forwarding of interior network packets and exterior network packets.

During actual operation, before a home gateway device is powered up, a relation table of corresponding relations between MAC addresses and ports is stored in an exterior communication Ethernet frame processing unit. This relation table is empty at the start, and will use a process of self learning to record source MAC addresses of frames sent up by various ports, and correspond to these ports.

For example, based on different methods of address allocation when connecting to a network, a main processor may automatically obtain an IP address, or be manually configured an IP address. The fifth port 3b may learn the MAC address of the main processor. An exterior communication Ethernet frame processing unit is to record the MAC address of the main processor, and write the corresponding relation between the MAC address and the fifth port 3b to a relation table.

When a packet sent by a networking computer enters by the sixth port 3c, an exterior communication Ethernet frame processing unit is to record corresponding relation between the MAC address of the computer and the sixth port 3c, and write the corresponding relation to a relation table. When there are several networking computers in a given time, the sixth port 3c is to record the MAC address of every networking computer, and write the corresponding relations between the addresses and the sixth port 3c to a relation table.

When a packet of exterior communication network enters an exterior communication Ethernet frame processing unit through an exterior communication adapter unit, the corresponding relation between the source MAC address of the packet and the fourth port 3a is to be recorded, and written to a relation table.

Through the above mentioned self learning process, a relation table recorded by an exterior communication Ethernet frame processing unit is as follows:

| Source MAC Address | Port No. |
| --- | --- |
| Main processor module MAC address | 3b |
| Exterior communication adapter unit MAC address | 3a |
| computer 1 MAC address | 3c |
| computer k MAC address | 3c |

While performing frame processing, the detailed processing policy of the exterior communication Ethernet frame processing unit 32 includes: For a frame entering the exterior communication Ethernet frame processing unit by the sixth port 3c, the exterior communication Ethernet frame processing unit is to directly forward the frame through the fourth port 3a without making any change to the frame.

For a frame entering the exterior communication Ethernet frame processing unit by the fifth port 3b, the exterior communication Ethernet frame processing unit is to directly forward the frame through the fourth port 3a without making any change to the frame.

For a frame entering the exterior communication Ethernet frame processing unit by the fourth port 3a, the exterior communication Ethernet frame processing unit is to decide: 1. if the destination address of the frame is the MAC address of a computer, the frame is to be forwarded directly through the sixth port 3c; 2. if the destination address of the frame is the MAC address of a main processor, the frame is to be forwarded directly through the fifth port 3b.

In the situation where there are several networking computers connected to a home gateway device, the frame processing policy of an exterior communication Ethernet frame processing unit includes:

For frames entering the exterior communication Ethernet frame processing unit by the fourth port 3a, as long as the destination address is the MAC address of a computer, these frames are to be forwarded through the sixth port 3c and enter a communication connection configuration selection unit.

A communication connection configuration selection unit should know which connection method is currently utilized by a connected networking computer, such as: Category 5 cable networking or wireless local area network (WLAN). Hence the communication connection configuration selection unit should correctly forward the frames received from the sixth port 3c to an interface unit currently connected with the networking computer, such as: an Ethernet interface unit, or a WLAN access point (AP).

Embodiment 1 provides a basic host device for home gateway control, the host device acts as the core controller in the entire digital household network system, and provides general computing resources and communication gateway hub function to a digital household. For an exterior communication network, the host device is the network access point of the home gateway device. For all household information appliances in the house, the host device is the main control computer. All of these household information appliances in the house are USB-based computer peripheral devices of the main host.

Embodiment 2

Figure 4:
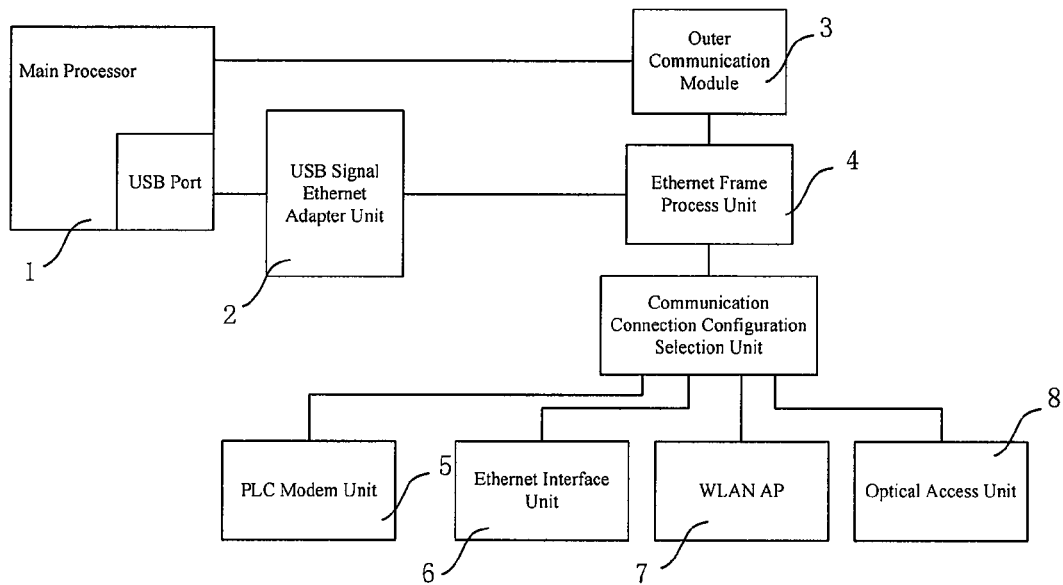
FIG. 4 is a schematic illustration showing the structure of a home gateway device provided by Embodiment 2 of the present invention.

FIG. 4 is a schematic illustration showing the structure of a home gateway device provided by Embodiment 2 of the present invention. Different from Embodiment 1, an inner interface unit comprising: a PLC modem unit 5, an Ethernet interface unit 6, a WLAN AP 7 and an optical access unit 8. A communication connection configuration selection unit is set in between an Ethernet frame process unit 4 and the inner interface unit. The communication connection configuration selection unit is connected to the Ethernet frame process unit 4, the PLC modem unit 5, the Ethernet interface unit 6, WLAN AP 7, and the optical access unit 8, respectively. The Ethernet interface unit is used for connecting networking devices in an interior network through an Ethernet. The wireless LAN access point WLAN AP 7 is used for communication with networking devices in an interior network through wireless connection. The optical access unit is used for performing optical-to-electric transformation on optical signals, in order to obtain electric signals for communication. The communication connection configuration selection unit is used for automatic configuration and switching of communication connections, in order to coordinate the data communication among the PLC modem unit 5, the Ethernet interface unit 6, WLAN AP 7, the optical access unit 8 and the Ethernet frame process unit 4.

If there are several different connection modes exist in an interior network, for example, if interior networking devices feature both Ethernet ports and wireless ports, then an inner interface unit that includes a PLC modem unit 5 and an Ethernet interface unit 6 may be used, where the Ethernet interface unit 6 connects to networking devices of an interior network through the Ethernet. A communication connection configuration selection unit selects between these two connection modes (PLC connection and Ethernet connection) based on a prearranged priority parameter. Additionally, an inner interface unit that includes an Ethernet interface unit 6 and a WLAN AP 7 may also be used, then the communication connection configuration selection unit is to select between these two connection modes (Ethernet connection and wireless connection), where WLAN AP 7 is used for communicating with networking devices of an interior network through wireless connection. If optical fiber connection mode is also configured in networking devices in a household, then an optical access unit 8 can be added to the inner interface unit as one of the connection modes that can be selected.

The system, which comprising a home gateway device and information appliances in an interior household network, provides several different interior network connection modes for various information household devices. The system can select one connection mode from these interior network connection modes, e.g. Ethernet connection, PLC power line carrier connection, wireless connection and optical access connection. The system can establish communication connection between interior devices and exterior network according to the status of interior networking devices. For example, a notebook computer normally may use a power line to transfer data, but if the notebook computer is using batteries to supply power, it can not receive data from power lines, and then the notebook computer may receive data through a wireless LAN access point, or through an ordinary network cable connected to an Ethernet interface unit.

A communication connection configuration selection unit may automatically identify connection modes that are available to each device, and may perform configuration according to a priority setting. When the connection mode changes (e.g. cables plugged in/pulled out, power supply interrupted), a host device may automatically switch to another available connection, and automatically perform configuration. Again using a notebook computer as an example, when the power supply of the notebook is interrupted, the host device may automatically switch to a connection mode that receives data from WLAN AP 7. In addition, a host device used for home gateway control may also implement forced reversing of connection modes, i.e. forced usage of a low-prioritized connection mode.

Priority parameters are usually prearranged. They may be prearranged by the manufacturer during manufacturing, or configured by a user. The priority level of various connection modes may be decided according to the layout of a household. The configuration of these priority levels is stored in a configuration selection file, which can be fetched by a communication connection selection unit. For example, in an automatic state, a twisted-pair cable connection has the highest priority, a PLC connection has the second highest, and a WLAN connection has the lowest priority; in a forced switching state, the connection mode is selected based on a control word.

Embodiment 3

Figure 5:
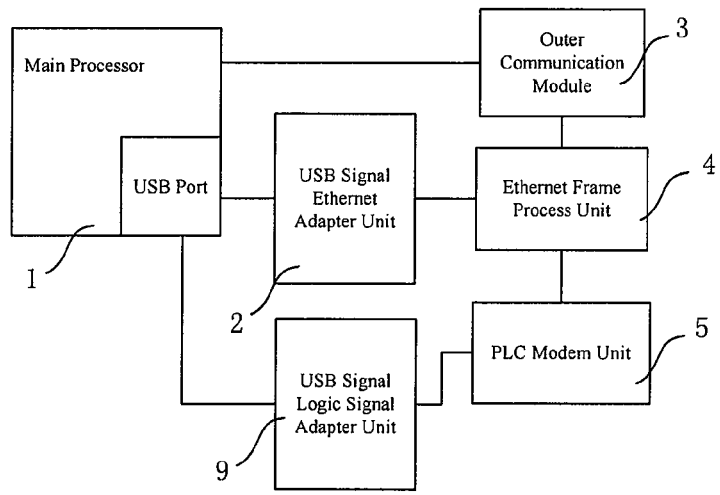
FIG. 5 is a schematic illustration showing the structure of a home gateway device provided by Embodiment 3 of the present invention.

FIG. 5 is a schematic illustration showing the structure of a home gateway device provided by Embodiment 3 of the present invention. Embodiment 3 added a USB signal logic signal adapter unit 9 to Embodiment 1. The USB signal logic signal adapter unit 9 is connected to a main processor 1 and a PLC modem unit 5, for transforming USB signals to serial logic control signals. Since apart from those household information appliances, there are simple appliances that only have a few logic functions, such as an electric lamp, an electric controlled faucet, etc. For these appliances, it is only necessary to send a few logic control commands for on/off switching, without any complicate information interchange. The USB signal logic signal adapter unit transforms USB control signals sent by the main processor to serial logic control signals, and modulates these logic control signals into power line carrier signals using the PLC modem unit 5, so that household appliances may be controlled through a power line. In conclusion, the PLC modem unit implements the modulation and demodulation operations between power line carrier signals and data signals, where data signals including but not limited to Ethernet signals and logic control signals.

Embodiment 4

Figure 6:
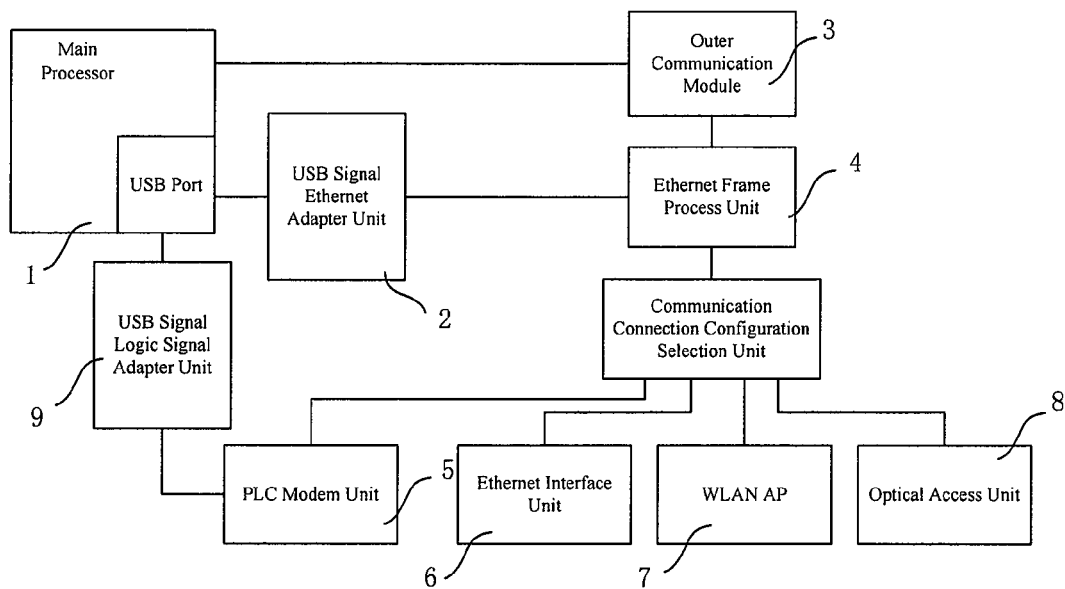
FIG. 6 is a schematic illustration showing the structure of a home gateway device provided by Embodiment 4 of the present invention.

Embodiment 4 is the combination of the previous three embodiments. FIG. 6 is a schematic illustration showing the structure of a home gateway device provided by Embodiment 4 of the present invention. As a favored implementation for household application, Embodiment 4 added a USB signal logic signal adapter unit 9 to Embodiment 2. The USB signal logic signal adapter unit 9 is connected to a main processor 1 and a PLC modem unit 5, for transforming USB signals to serial logic control signals.

Figure 7:
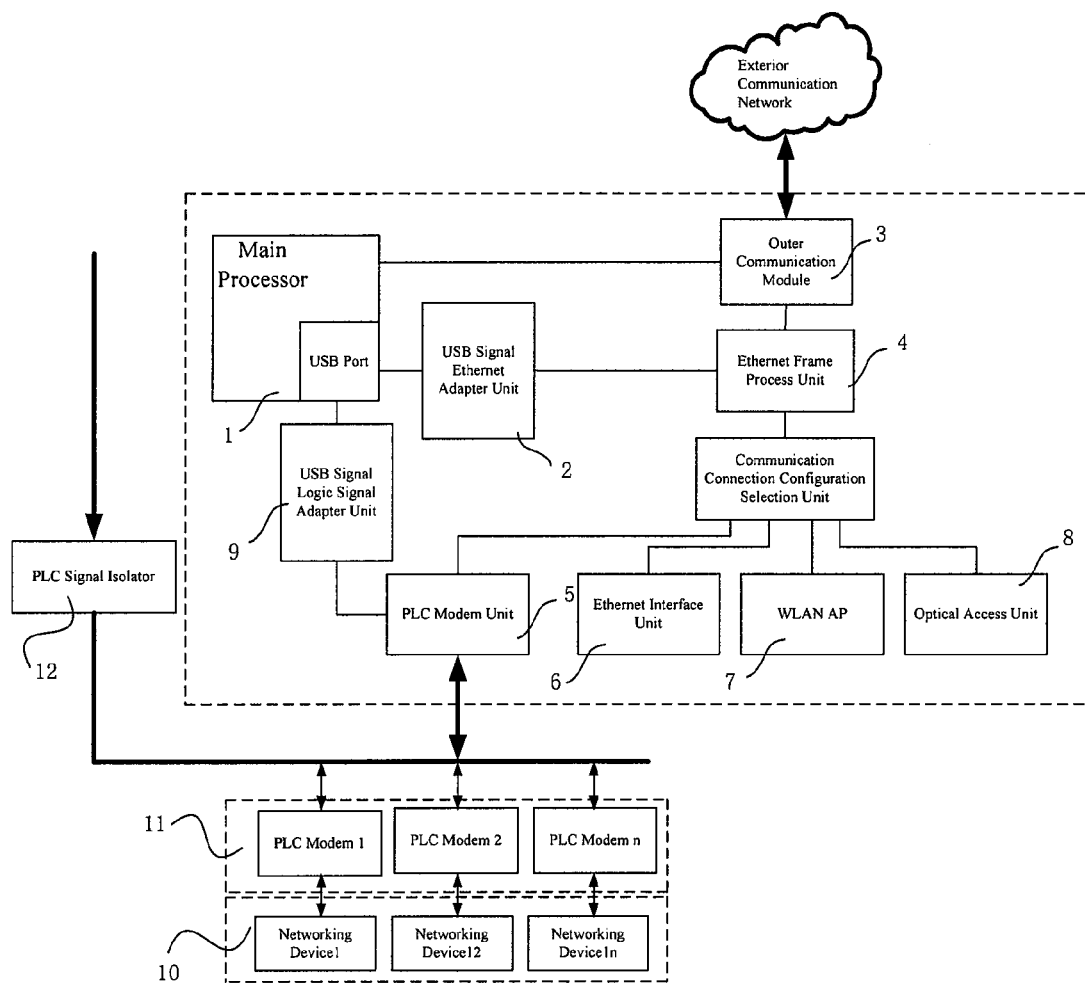
FIG. 7 is a schematic illustration showing an application system of the home gateway device provided by Embodiment 4 of the present invention.

An application system comprising Embodiment 4, an interior household network and an exterior communication network is shown in FIG. 7. FIG. 7 is a schematic illustration showing an application system of the home gateway device provided by Embodiment 4 of the present invention. The networking devices 10 (including household information appliances and computers) of an interior household network are connected to the home gateway device through PLC connection, Ethernet connection, wireless connection and/or optical fiber connection. For a specific networking device, when using PLC connection for communication, the networking device needs to perform modulation/demodulation between electric carrier signals and Ethernet signals by using PLC modem 11. Filtering and carrying of PLC signals are accomplished by a PLC modem unit 5 in an inner interface unit. In addition, a PLC signal isolator 12 is set in a power line between an exterior power grid and an interior household network, in order to achieve the isolation between low frequency electric current and high frequency PLC signals, so that to prevent high frequency PLC signals outputting to the exterior network, and exterior high frequency PLC signals entering the interior household network.

It should be stated that the above embodiments are only used to describe the technical solutions of the present invention, and they are not used to impose any restriction or limit to the present invention. Despite the present invention having been elaborately described in reference to the above embodiments, it should be understood by a person skilled in the art: it is still possible to modify the technical solutions described in the above embodiments, or replace part of the technical features with equivalent ones, while these modifications and replacements do not detach the essence of corresponding technical solutions from the spirit and scope of the technical solutions described in each embodiment of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A home gateway device, comprising:
   a main processor to generate information process signals and control signals;
   a computer bus signal Ethernet adapter unit, connected to the main processor, to translate signals between computer bus signals and Ethernet signals;
   an Ethernet frame process unit, connected to the computer bus signal Ethernet adapter unit, to forward the received Ethernet frame based on a pre-arranged frame processing policy;
   an inner interface unit, connected to the Ethernet frame process unit, to connect interior networking devices of an interior network; and
   an outer communication module, connected to the main processor and the Ethernet frame process unit, to translate addresses and transfer data between the interior network and an exterior communication network, wherein the Ethernet frame process unit includes:
      a first port, connected to the outer communication module, to transfer Ethernet signals through the outer communication module;
      a second port, connected to the computer bus signal Ethernet adapter unit, to transfer computer bus format encapsulated Ethernet signals; and
      a third port, connected to the inner interface unit, to transfer Ethernet signals between the interior networking devices and the main processor.

2. The home gateway device of claim 1, wherein the inner interface unit is any one of the following: a power line communication modulation and demodulation unit, an Ethernet interface unit, a wireless local area network access point, or any combination of the above, wherein the power line communication modulation and demodulation unit performs modulation and demodulation operations between power line carrier signals and data signals, wherein the Ethernet interface unit connects the interior networking devices through an Ethernet connection, and wherein the wireless local area network access point connects the interior networking devices through a wireless connection.

3. The home gateway device of claim 2, wherein the inner interface unit is a power line communication modulation and demodulation unit, and wherein the home gateway device further comprises a USB signal logic signal adapter unit, connected to the power line communication modulation and demodulation unit and the main processor, to perform transformation between USB signals and serial logic signals.

4. The home gateway device of claim 1, wherein the computer bus signal Ethernet adapter unit is one of a USB signal Ethernet adapter unit and a PCI bus Ethernet adapter unit, wherein the USB signal Ethernet adapter unit performs signal transformation between USB signals and Ethernet signals, and wherein the PCI bus Ethernet adapter unit performs signal transformation between PCI signals and Ethernet signals.

5. The home gateway device of claim 2, further comprising a communication connection configuration selection unit coupled between the Ethernet frame process unit and the inner interface unit to perform automatic configuration and switching of connection modes of the interior network and the exterior communication network.

6. The home gateway device of claim 1, wherein the outer communication module includes:
   a PCI bus Ethernet adapter unit, connected to the main processor through a PCI bus, to transform signals between PCI signals and Ethernet signals;
   an exterior communication Ethernet frame processing unit, connected to the PCI bus Ethernet adapter unit, to forward received Ethernet frames according to a prearranged port control forwarding policy; and
   an exterior communication adapter unit, connected to the exterior communication Ethernet frame processing unit, to communicate with the exterior communication network.

7. The home gateway device of claim 6, wherein the exterior communication Ethernet frame processing unit includes:
   a fourth port connected to the exterior communication adapter unit, to transfer Ethernet signals through the exterior communication adapter unit;
   a fifth port connected to the PCI bus Ethernet adapter unit, to transfer PCI encapsulated Ethernet signals; and
   a sixth port connected to the Ethernet frame process unit, to transfer Ethernet signals between an exterior communication network and a personal computer.

8. The home gateway device of claim 7, wherein the exterior communication Ethernet frame processing unit is configured to:
   forward Ethernet frames received by the sixth port to the fourth port;
   forward Ethernet frames received by the fifth port to the fourth port;
   read the destination address of an Ethernet frame received by the fourth port;
   when the destination address is the media access control address of a computer, forward the Ethernet frame to the sixth port; and
   when the destination address is the media access control address of the main processor, forward the Ethernet frame to the fifth port.

9. The home gateway device of claim 6, wherein the exterior communication adapter unit includes:
   a unit to receive data packets;
   a unit to analyze the destination IP addresses of the received data packets;
   a unit to obtain an IP address that corresponds to the analyzed destination IP address, based on prearranged corresponding relations between public network IP addresses and interior network IP addresses, and based on the analyzed destination IP address; and
   a unit to transfer the received data packets according to the obtained IP addresses.

10. The home gateway device of claim 9, wherein the unit to transfer the received data packets according to the obtained IP addresses includes:
   a sub module to translate the obtained IP addresses to media access control addresses according to the obtained IP addresses and previously stored corresponding relations between IP addresses and media access control addresses; and a sub module to transfer the received data packets according to the media access control addresses obtained through translation.

11. The home gateway device of claim 1 wherein the Ethernet frame process unit is configured to:

forward Ethernet frames received by the first port to the third port;

forward Ethernet frames received by the second port to the third port;

determine the encapsulation format of an Ethernet frame received by the third port;

when the encapsulation format of the Ethernet frame is computer bus format, forward the Ethernet frame to the second port; and when the encapsulation format of the Ethernet frame is IP group format, forward the Ethernet frame to the first port.

12. A home gateway device, comprising:

a main processor to generate information process signals and control signals;

a computer bus signal Ethernet adapter unit, connected to the main processor, to translate signals between computer bus signals and Ethernet signals;

an Ethernet frame process unit, connected to the computer bus signal Ethernet adapter unit, to forward the received Ethernet frame based on a pre-arranged frame processing policy;

an inner interface unit, connected to the Ethernet frame process unit, to connect interior networking devices of an interior network; and an outer communication module, connected to the main processor and the Ethernet frame process unit, to translate addresses and transfer data between the interior network and an exterior communication network, wherein the outer communication module includes:

a PCI bus Ethernet adapter unit, connected to the main processor through a PCI bus, to transform signals between PCI signals and Ethernet signals;

an exterior communication Ethernet frame processing unit, connected to the PCI bus Ethernet adapter unit, to forward received Ethernet frames according to a prearranged port control forwarding policy; and an exterior communication adapter unit, connected to the exterior communication Ethernet frame processing unit, to communicate with the exterior communication network.

13. The home gateway device of claim 12 wherein the exterior communication Ethernet frame processing unit includes:

a fourth port connected to the exterior communication adapter unit, to transfer Ethernet signals through the exterior communication adapter unit;

a fifth port connected to the PCI bus Ethernet adapter unit, to transfer PCI encapsulated Ethernet signals; and a sixth port connected to the Ethernet frame process unit, to transfer Ethernet signals between an exterior communication network and a personal computer.

14. The home gateway device of claim 13 wherein the exterior communication Ethernet frame processing unit is configured to:

forward Ethernet frames received by the sixth port to the fourth port;

forward Ethernet frames received by the fifth port to the fourth port;

read the destination address of an Ethernet frame received by the fourth port;

when the destination address is the media access control address of a computer, forward the Ethernet frame to the sixth port; and when the destination address is the media access control address of the main processor, forward the Ethernet frame to the fifth port.

15. The home gateway device of claim 12 wherein the exterior communication adapter unit includes:

a unit to receive data packets;

a unit to analyze the destination IP addresses of the received data packets;

a unit to obtain an IP address that corresponds to the analyzed destination IP address, based on prearranged corresponding relations between public network IP addresses and interior network IP addresses, and based on the analyzed destination IP address; and a unit to transfer the received data packets according to the obtained IP addresses.

16. The home gateway device of claim 15 wherein the unit to transfer the received data packets according to the obtained IP addresses includes:

a sub module to translate the obtained IP addresses to media access control addresses according to the obtained IP addresses and previously stored corresponding relations between IP addresses and media access control addresses; and a sub module to transfer the received data packets according to the media access control addresses obtained through translation.

* * * * *